Figure 1:
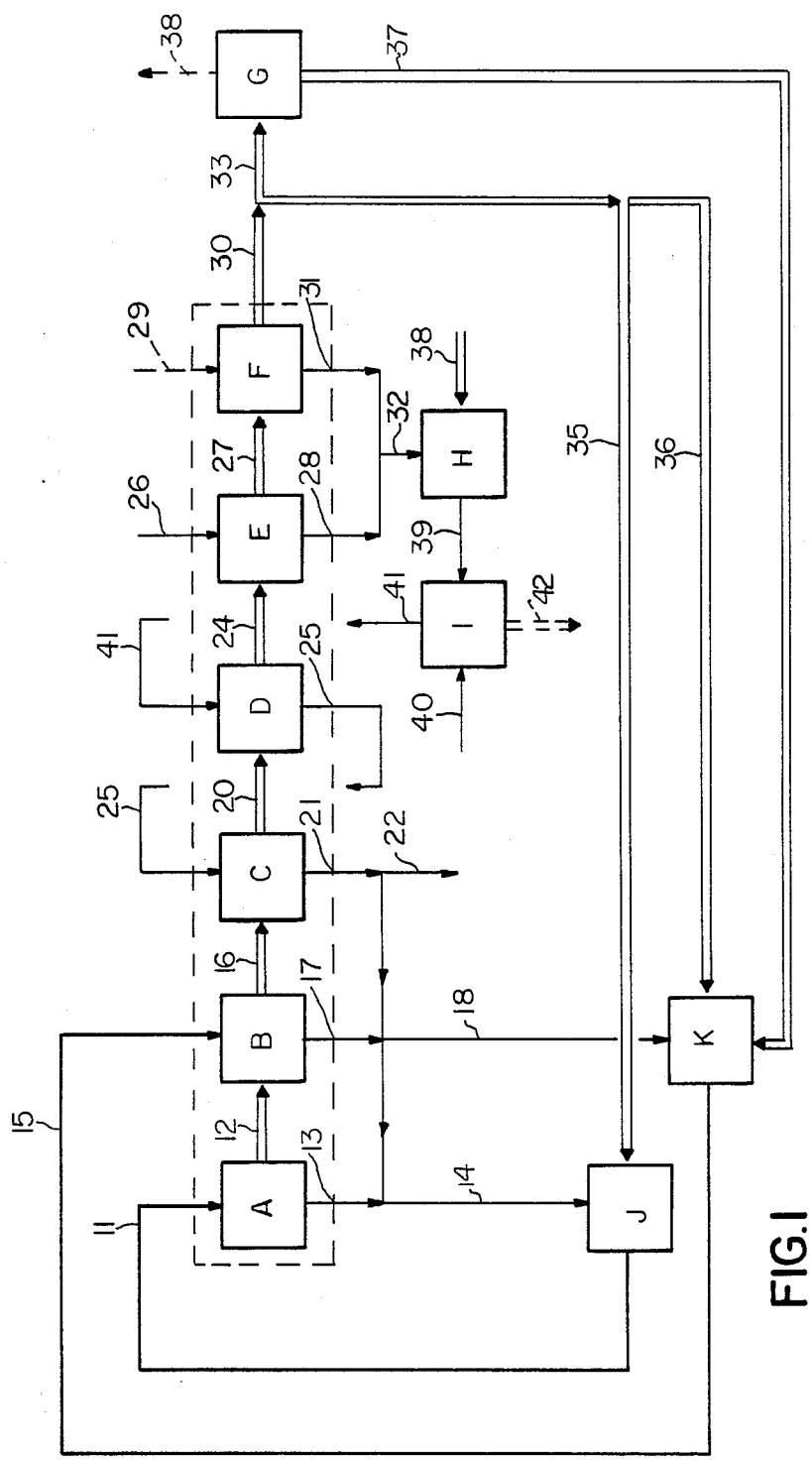

United States Patent [19]

Östman

[11] Patent Number: 4,894,217

[45] Date of Patent: Jan. 16, 1990

[54] PROCESS FOR CAUSTICIZING OF AN AQUEOUS SOLUTION CONTAINING ALKALI CARBONATE

[75] Inventor: Per H. Östman, Jorvas, Finland

[73] Assignee: Ekono Oy, Espoo, Finland

[21] Appl. No.: 128,652

[22] PCT Filed: Nov. 21, 1986

[86] PCT No.: PCT/FI86/00131

§ 371 Date: Oct. 13, 1987

§ 102(e) Date: Oct. 13, 1987

[87] PCT Pub. No.: WO87/03314

PCT Pub. Date: Jun. 4, 1987

[30] Foreign Application Priority Data

Nov. 22, 1985 [FI] Finland ................................. 854628

[51] Int. Cl.$^4$ .......................... C01F 1/00; C01D 3/06; C01B 1/00; D21C 9/00

[52] U.S. Cl. .................................... 423/659; 423/165; 423/183; 423/430; 423/432; 423/DIG. 3; 423/641; 162/11; 162/30.11

[58] Field of Search ............... 423/165, 183, 430, 432, 423/641, DIG. 3, 657; 162/30.11

[56] References Cited

U.S. PATENT DOCUMENTS

| | | | |
|---|---|---|---|
| 1,754,208 | 4/1930 | Bradley et al. | 423/DIG. 3 |
| 2,211,908 | 4/1940 | O'Connor | 423/641 |
| 2,287,886 | 6/1942 | Beekhuis, Jr. et al. | 423/430 |
| 2,552,183 | 5/1951 | Knight | 423/183 |
| 3,268,388 | 8/1966 | Baumann | 423/432 |
| 4,668,342 | 5/1987 | Blackwell | 423/432 |

*Primary Examiner*—Gregory A. Heller
*Attorney, Agent, or Firm*—Klarquist, Sparkman, Campbell, Leigh and Whinston

[57] ABSTRACT

Process for causticizing a water solution containing alkali carbonate with calcium oxide and hydroxide by bringing the water solution containing alkali carbonate into contact with the calcium oxide or hydroxide and by separating the alkali hydroxide solution arisen in the causticizing from the calcium carbonate precipitate. The water solution containing alkali carbonate is conducted through a bed which has been formed by mixing calcium oxide and calcium carbonate in the causticized alkali solution and by removing the excess alkali solution.

3 Claims, 3 Drawing Sheets

PROCESS FOR CAUSTICIZING OF AN AQUEOUS SOLUTION CONTAINING ALKALI CARBONATE

The present invention relates to a process for causticizing a water solution containing alkali carbonate, usually green liquor, with calcium oxide and/or hydroxide. This invention relates in particular to a method for causticizing a water solution containing alkali carbonate, in which the alkali carbonate containing water solution is brought into contact with calcium oxide or/and hydroxide, upon which the alkali hydroxide solution produced in the causticizing is separated from the calcium carbonate precipitate. With the method according to the present invention a digestion liquor intended to be used in the preparation process of soda or sulphate pulp can be prepared from green liquor.

In the pulp preparation process, for instance according to the sulphate process, the regeneration of cooking chemicals an important partial process. By the present causticizing process, the sodium carbonate and the sodium sulphide melt are dissolved into weak white liquor, whereby a water solution of sodium carbonate and sodium sulphide and other sodium salts (sodium sulphate), which are more or less inert with regard to the cooking process, as well as to a certain extent other metal salts appearing as impurities, is obtained. When this so-called green liquor has been purified from solid impurities, it is causticized into white liquor. Nowadays the causticizing is carried out as follows.

Calcined lime (CaO) is added to the green liquor, whereby the calcium oxide first is extinguished by reaction with the water of the green liquor, thus forming drowned lime. The calcium ions, which are generated by the dissolving of the calcium hydroxide, then form together with the carbonate ions of the solution a calcium carbonate precipitate, whereby the hydroxide ion concentration grows and its carbonate ion concentration decreases.

The above process of extinction and causticizing can be described in principle with the following balance reaction:

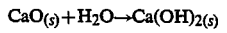

$$CaO_{(s)} + H_2O \rightarrow Ca(OH)_{2(s)}$$

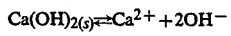

$$Ca(OH)_{2(s)} \rightleftharpoons Ca^{2+} + 2OH^-$$

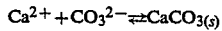

$$Ca^{2+} + CO_3^{2-} \rightleftharpoons CaCO_{3(s)}$$

From a reaction kinetic point of view, the causticizing event is a heterogeneous system in two senses, as the calcium has first to be dissolved from the solid calcium hydroxide and then to form a precipitate with the carbonate ions of the solution.

Typical of heterogeneous systems is that they pass very slowly towards the state of equilibrium because of the slow interphasial diffusion. These conditions are particularly conspicuous in the causticizing process because of its double heterogeneity and above all because of the low solubility of calcium hydroxide. The diffusion rate being highly dependent of the temperature, the causticizing rate decreases further as the temperature sinks.

For the above reasons a disadvantage of the causticizing process used at present is that a relatively long retention time, and thus also relatively large causticizing vessels, are required. Still the causticizing degree required by a reaction balance is not achieved, as a relatively large portion of the carbonate solution to be causticized has a much shorter retention time than the average retention time when series connected mixing causticizing receptacles are being used.

The correct batching of the lime quantity is also difficult. If too little lime is batched, the causticizing degree is naturally low, and again, if too much is batched, the settling of the white liquor becomes difficult and the combustion capacity need and heat consumption of the caustic sludge increases.

In addition, the impurities of the above green liquor have to be efficiently removed from the green liquor, for the settling of the white liquor to succeed. For these reasons also, the settling of the green liquor and the white liquor require large clarifiers.

With the present causticizing process, the settling of the causticizing and the green liquor as well as the white liquor has to take place at a temperature that is as high as possible, since the diffusion rate is a decisive factor, and this again is highly dependent on the temperature. The high temperature and the high alkali concentration lead to accentuated material requirements e.g. with regard to the filters and wires in the present process.

The purpose of the invention is to remove or at least reduce the above disadvantages appearing in the present causticizing methods by minimizing the restriction brought about by the diffusion as to the causticizing rate, and thus achieve a rapid causticizing, regardless of the temperature.

The main characteristics of the invention are disclosed in the enclosed claims.

In the preferred embodiment of the invention, a water solution containing alkali carbonate is put into contact with calcium hydroxide by conducting the water solution containing alkali carbonate through a bed formed by calcium hydroxide and calcium carbonate mother crystals. The bed containing calcium hydroxides and calcium carbonate mother crystals is thus advantageously formed by adding calcium carbonate to white liquor and/or calcium oxide, by mixing the calcium oxide and the white liquor and filtering or displacing the white liquor in order to generate a bed which contains calcium hydroxide and calcium carbonate mother crystals.

For each mole of calcium oxide and hydroxide at least ⅓ and advantageously at least 1 mole of calcium carbonate is added.

The green liquor is displaced through the bed thus formed, whereby the green liquor gradually is transformed into calcium carbonate. By this displacing technique, a diffusion layer, which is as thin as possible, is produced around the calcium hydroxide and calcium carbonate crystals. As the bed contains already in the initial step calcium carbonate crystals, the settling of the calcium carbonate around these mother crystals is as rapid as possible and moreover, the grain size of the caustic sludge thus formed becomes remarkably greater compared to the present method and consequently, the filtering is rapid and convenient, and thus the size of the apparatus is smaller than the present one.

In order to obtain as high a causticizing degree as possible, and to utilize and consume the calcium hydroxide in the bed as efficiently as possible, the above green liquor displacement is advantageously divided into at least two displacing steps so that in the first displacing step green liquor is used, which contains also white liquor and is obtained from the subsequent displacing step and of which the amount compared to that of the calcium hydroxide contained in the bed is such, that it does not consume the full amount of calcium hydroxide contained in the bed, but the bed still contains calcium hydroxide after the displacement. In the second displacing step, only green liquor is used, so that the solution contains a surplus of sodium carbonate compared to the calcium hydroxide contained in the bed, in order to be able to consume all the calcium hydroxide contained in the bed, by adjusting the amount of green liquor to be used so that the liquid removed in the displacement contains both carbonate and hydroxide.

For the adjustment, the hydroxide concentration of the removed solution is measured. The adjustment does not have to be exact and still the above advantages are achieved, i.e. all the active lime is consumed and the causticity of the removed white liquor is as high as possible. The liquid removed in the second displacing step only has to vary between nearly pure green liquor and nearly pure white liquor.

In order to prevent as efficiently as possible that part of the calcium carbonate arisen during the displacement causticizing is crystallized on top of the wire or the filter fabric and thus would obturate it, the above bed is preferably formed in two steps, so that the portion of the bed next to the wire or the filter fabric contains merely calcium carbonate and only on top of this the above calcium hydroxide-calcium carbonate bed is formed.

The calcium carbonate arisen from the calcium hydroxide crystals, which are next to the wire or the filter fabric, is crystallized on top of the lime sludge crystals in the bed layer below.

The forming of the calcium hydroxide and calcium carbonate bed and the connected preforming of the bed and the subsequent washing with water and drying of the lime sludge bed arisen in the displacing causticizing according to the process, can be carried out either as a periodical or a continuous process. In both cases, the different process steps are however similar and only the required device solutions differ from each other.

In both cases, the required process devices already exist. In the periodical case, the main device may be for instance a so-called pressure filter in accordance with the FI patent specification No. 65 455, which nowadays has been used for the water washing of caustic sludge and to some extent also as white liquor filter. In the case of the invention, the entire displacing causticizing advantageously takes place in the same pressure filter before the washing and the drying of the lime sludge produced in it. In the periodical case, the bed remains in the same chamber all the time, starting from the step of precoating the wire with lime sludge until the lime sludge has been dried with air, i.e. during both the forming of the calcium hydroxide-calcium carbonate bed and the two step displacement causticizing. By means of a valve system, the chamber concerned is connected to the suspension, liquid or air feeding system concerned, and to the storage tank of the corresponding filtrate.

In the continuous embodiment, e.g. a so-called filter band press may be used, which so far has been used both in lime sludge washing and white liquor filtering. The pre-bed formed and the calcium hydroxide-calcium carbonate bed formed on top of it move along with the filter band through the displacing steps and the washing and drying steps.

Figure 2:
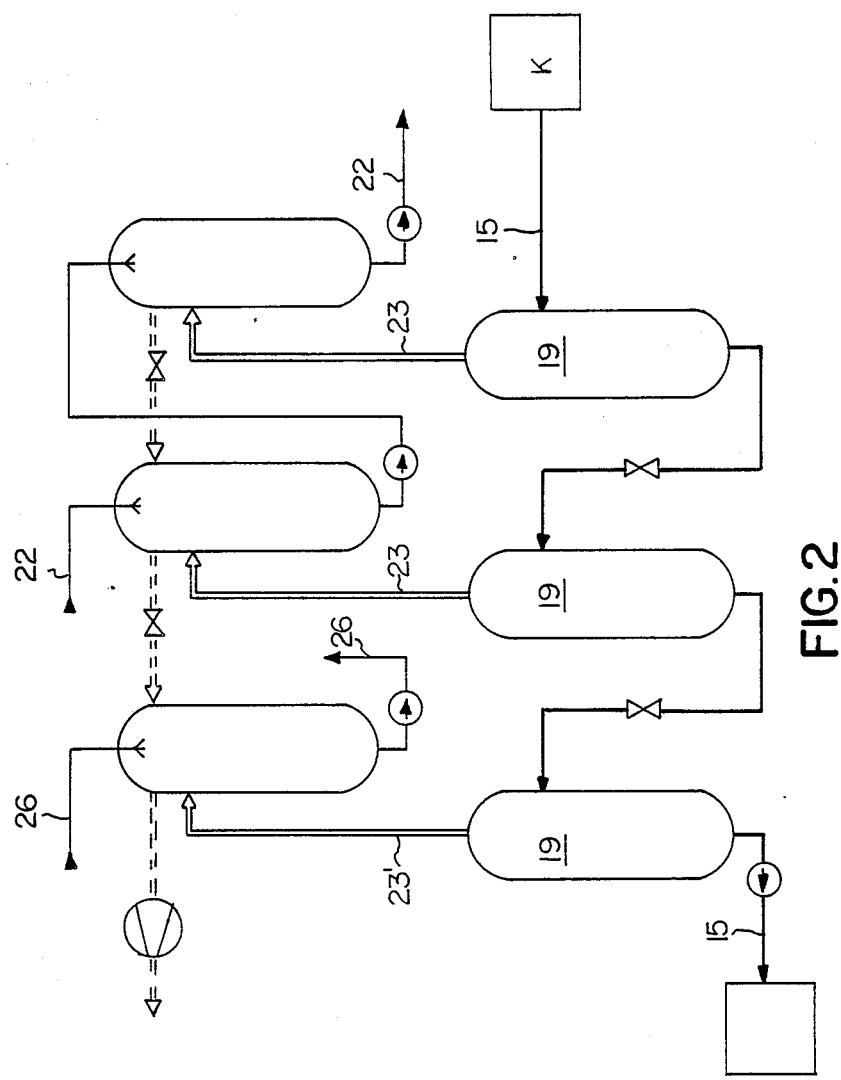
Figure 3:
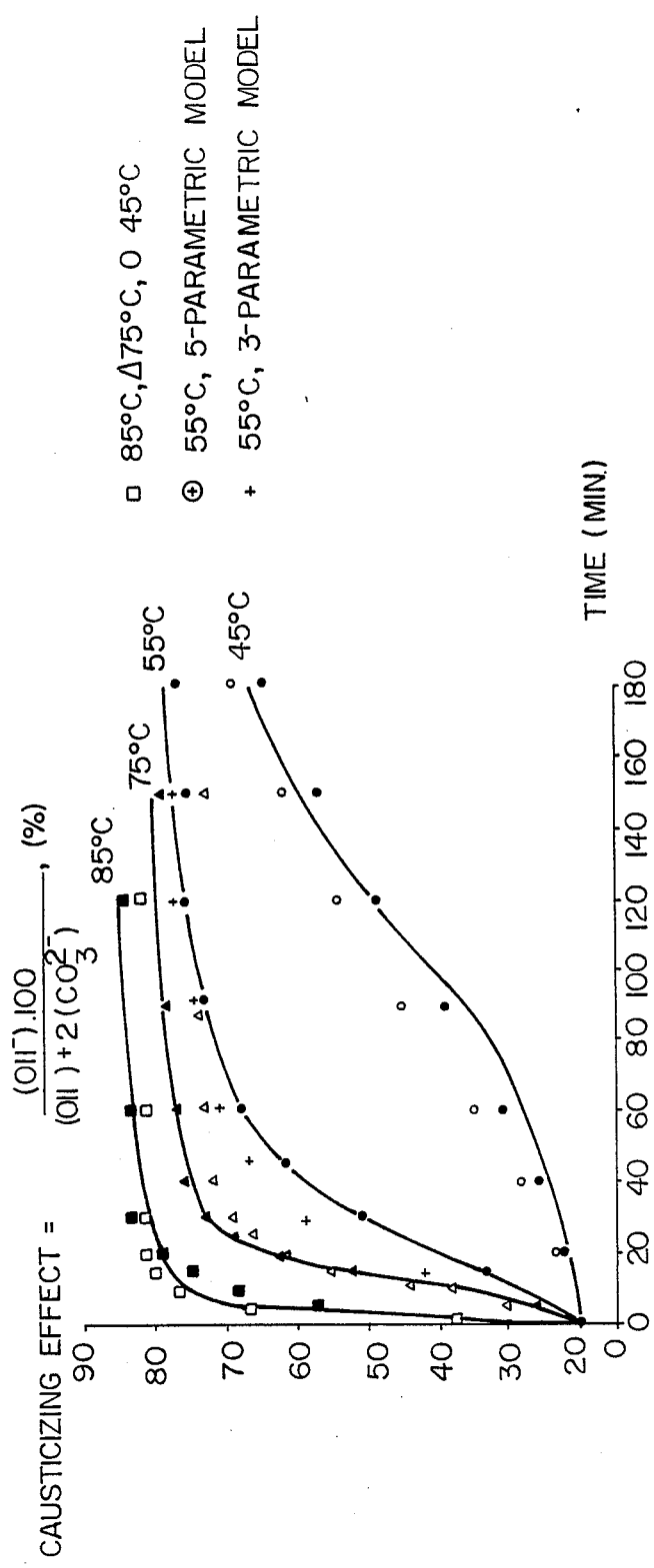

The invention is described in detail below with reference to the enclosed drawings, in which FIG. 1 represents a flow diagram of the preferred embodiment of the process according to the invention, FIG. 2 represents a vertical perspective of the heat transfer equipment, which can be used in the process according to FIG. 1, and FIG. 3 represents the causticizing degree as a function of the causticizing period and temperature.

In FIG. 1 the causticizing process according to the invention is presented step by step.

In step A a bottom bed portion 12 is formed on top of the caustic sludge-white liquor slurry 11, and the excess white liquor 13 is filtered away.

In step B a bed portion 16 is formed by feeding white liquor, slaked lime and lime sludge 15 on top of the bottom bed 12 and the excess white liquor 17 is filtered away.

In step C the green liquor 25 is displaced through the bed, the green liquor being partly causticized and further causticized up to the final causticizing degree before it is removed as white liquor 21.

The bed 20, which remains after the displacing C, still contains calcium hydroxide, and through this in step D green liquor (raw aqueous alkali carbonate solution) 41 is displaced, which partly is causticized as far as the amount of calcium hydroxyde in the bed 20 permits.

The remaining lime sludge bed 24, which contains green liquor, is washed with water 26 in step E, whereby thin green liquor 28 and lime sludge 27 containing water is obtained.

The dry matter content of the lime sludge 27 is increased in step F by displacing air 29 through it, so that the major part of the water amount contained in it is separated as a flow 31.

The thin green liquor 28 and the above water flow 31 are combined into the flow 32, which is used in step H, in which the melt 38 deriving from the soda recovery unit is dissolved.

The green liquor 39 formed is conducted into step I, in which its impurities 42 are removed and washed with water 40 and from which the green liquor 41 is lead into the above step D.

A portion 35 of the washed and dried lime sludge 30 from the step F is mixed with the portion 14 of the white liquors 13, 17 and 21 in step J, in which slurry 11 for the pre-bed 12 is prepared.

A second portion 36 of the lime sludge 30 from the step F is mixed with the burnt lime 37 and the mixture is extinguished with the portion 18 of the white liquors 17 and 21 in step K, in which the slurry 15 is formed, which is used in the above step B.

The final portion 33 of the dried caustic sludge 30 is conducted to the lime sludge reburning kiln G, where it is burnt into lime 37 and carbon dioxide 38.

The resulting white liquor is removed as a flow 22 from the white liquor flow 21 of step C.

Since the slaking is a heat producing reaction, the temperature of the slurry 15 produced in the extinction step K is higher than that of the white liquor 18 used in this step. In case one wishes to adopt this extinction temperature, in order to obtain a temperature which is as high as possible for the white liquor produced, but still wants to keep the process steps A-H at a relatively low temperature, the heat transfer system schematically presented in FIG. 2 may for instance be used for transferring heat from the slurry flow 15 to the white liquor produced 22.

The slurry 15 deriving from the extinction K is conducted to two or several expansion vessels 19, in which a pressure is maintained, which is lower than the pressure corresponding to the boiling point of the slurry 15, so that its temperature sinks and the fresh white liquor 22 is heated with the expansion steam produced 23 either directly or indirectly with the heat exchanger.

The vapour 23 from the last expansion vessel 19 is condensed with water 26, of which the temperature thus rises. This heated water can then be used in the washing of the caustic sludge in step E (FIG. 1).

By adjusting the pressure in the last expansion step of the slurry for instance by means of a vacuum pump and the temperature and amount of the used cooling water, the temperature of the slurry used in step B (FIG. 1) and thus also the temperature of the displacing causticizing is adjusted.

With this heat transfer system it is possible to produce a white liquor of which the temperature is even above 100° C. and still keep the temperature in the causticizing step very low, e.g. at 60°–70° C.

With the present causticizing methods the rate of causticizing is relatively slow, particularly if the temperature is low. FIG. 3 represents the causticizing degree as a function of the causticizing period and temperature. With the method of the invention tests have been made at a temperature of 25° C. With a displacing causticizing a causticizing degree was obtained, which corresponded approximately to the causticizing degree in the state of equilibrium, i.e. a causticizing degree of about 85% with a concentration of white liquor of 110 g active alkali/liter calculated as sodium oxide.

As it appears from FIG. 3, in a conventional causticizing process, in its initial step, i.e. Immediately upon the hydration of the lime, the rate of causticizing is slower than after a certain period of time (in FIG. 3 the rate of causticizing is the derivative of the curve). For instance at a temperature of 45° C. the maximal rate is not achieved until after about two hours. This phenomenon cannot be explained otherwise than that the calcium carbonate crystallization is a limiting partial event of the causticizing event in the initial step of the causticizing. The reason for this is that the solution has to be very supersaturated in respect of the calcium carbonate, before it begins to crystallize, there being very few so-called mother crystals in the beginning, on top of which the calcium carbonate could settle. By adding calcium carbonate or lime sludge into green liquor in conventional causticizing, the causticizing can be accelerated, particularly in its initial step. In addition, in this way one achieves also the advantage that the produced calcium carbonate i.e. lime sludge has greater crystals, whereby the clarification or filtering of the white liquor becomes easier and more rapid. The white liquor obtained is purer, and the lime sludge obtained is easier to wash and purer.

With the method according to the invention the following advantages are achieved:

It is possible to obtain a white liquor, of which the concentration of active alkali is higher than with present causticizing methods and thus e.g. the heat consumption in a pulp cooking process is reduced and the chemical charge of the regeneration process of chemicals is lower. The heat consumption of the evaporation plant and the lime sludge reburning kiln decreases, the chemical losses as well.

A purer white liquor is obtained and thus the problems caused by e.g. incrusts are reduced.

Smaller space requirement and smaller investment costs.

Simple adjustment.

I claim:

1. A process for causticizing a raw aqueous alkali carbonate solution (41) with calcium hydroxide (15) by contacting the raw aqueous alkali carbonate solution (41) with the calcium hydroxide (15) and separating an alkali hydroxide solution (21) produced in the causticizing (C,D) from a calcium carbonate precipitate (24), characterized in that:
   (a) an unused bed (16) of calcium hydroxide and calcium carbonate is at least partially formed by mixing calcium oxide (37) and calcium carbonate (36) with a part (18) of the alkali hydroxide solution (21) from a prior such causticizing (C);
   (b) the raw aqueous alkali carbonate solution (41) is first led through a partially used bed (20) of calcium hydroxide and calcium carbonate to produce a partly causticized aqueous alkali carbonate solution (25), the partially used bed (20) having been formed when such a partly causticized aqueous alkali carbonate solution (25) was led through an unused bed (16) at a prior time, the carbonate molar quantity of the raw aqueous alkali carbonate solution (41) being greater than the total calcium hydroxide molar quantity of the partially used bed (20) before being led therethrough;
   (c) the resulting partly causticized aqueous alkali carbonate solution (25) is led through the unused bed (16), through which an aqueous alkali carbonate solution has not previously been led, such that the alkali hydroxide solution (21) and a partially used bed (20) are formed; and
   (d) an excess portion (22) of the alkali hydroxide solution (21) produced in the causticizing (C) is withdrawn.

2. A process according to claim 1 characterized in that at least one of the beds has two portions through which the raw or the partially causticized aqueous alkali carbonate solution is conducted, one portion consisting essentially of calcium hydroxide and calcium carbonate mother crystals and the other portion consisting essentially of calcium carbonate mother crystals.

3. A process for causticizing an aqueous alkali carbonate solution, the process comprising:
   forming a bed by mixing calcium oxide and calcium carbonate with an aqueous alkali hydroxide solution obtained from a prior causticizing of an aqueous alkali carbonate solution and by withdrawing excess alkali hydroxide solution; and
   conducting an aqueous alkali carbonate solution through the bed to produce an aqueous alkali hydroxide solution and calcium carbonate.

* * * * *